United States Patent
Brune et al.

(10) Patent No.: US 7,319,855 B1
(45) Date of Patent: Jan. 15, 2008

(54) METHOD FOR CHARGING INTERNET SERVICES VIA A MOBILE TELEPHONE

(75) Inventors: Peter Brune, Bonn (DE); Patrik Ljungström, Königswinter (DE); Uwe Michel, Bad Honnef (DE); Jörg Rass, Freehan Königsdorf (DE); Leonhard Schmickler, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/089,504

(22) PCT Filed: Sep. 28, 2000

(86) PCT No.: PCT/DE00/03421

§ 371 (c)(1),
(2), (4) Date: Jul. 29, 2002

(87) PCT Pub. No.: WO01/24122

PCT Pub. Date: Apr. 5, 2001

(30) Foreign Application Priority Data

Sep. 28, 1999 (DE) ................................ 199 46 537

(51) Int. Cl.
*H04M 11/00* (2006.01)

(52) U.S. Cl. ...................... 455/406; 455/405; 705/39; 705/40; 179/114.01; 179/114.03; 179/114.17; 179/115.01

(58) Field of Classification Search ........ 379/111–114, 379/114.01, 114.03, 114.17, 115.01; 370/389; 455/405–407, 408; 705/39–40
See application file for complete search history.

(56) References Cited

U.S. PATENT DOCUMENTS 5,749,075 A * 5/1998 Toader et al. .................. 705/14

(Continued)

FOREIGN PATENT DOCUMENTS

EP 0 917 327 5/1999

(Continued)

OTHER PUBLICATIONS

Norman Bishop, Telecommunications Service Providers as Payment Facilitators, European Business Review. Bardford: 1999. vol. 99, Iss. 4; p. 228.*

(Continued)

*Primary Examiner*—Hani M. Kazimi
*Assistant Examiner*—Stefano Karmis
(74) *Attorney, Agent, or Firm*—Baker & Daniels LLP

(57) ABSTRACT

A method is provided for a mobile telephone users to pay small individual fees for certain content when surfing the Internet using a mobile telephone terminal, for example, a WAP-enabled terminal. The method establishes a payment gateway which is accessible by the mobile telephone Internet user via the mobile telephone terminal and by a provider via a provider server. Customer data of the user is held securely in a database of the payment gateway and is not transmitted over the Internet or held in the mobile terminal. A micropayment account opened at a bank is synchronized continuously with the payment gateway. To provide payment of fees for content, a reservation of a certain amount is made in the payment account via the payment gateway and is authorized by the user to the provider allowing the provider to debit amounts against the reservation. Actual charges are transmitted from the provider to the payment gateway and allocated against the reservation debiting the amounts from the micropayment account, crediting the provider and canceling the reserved amount.

14 Claims, 2 Drawing Sheets

U.S. PATENT DOCUMENTS

| | | | | |
|---|---|---|---|---|
| 5,884,284 | A | 3/1999 | Peters et al. | 705/30 |
| 5,899,982 | A | 5/1999 | Randle | 705/35 |
| 6,078,806 | A * | 6/2000 | Heinonen et al. | 455/406 |
| 6,125,113 | A * | 9/2000 | Farris | 370/389 |
| 6,188,752 | B1 * | 2/2001 | Lesley | 379/114 |
| 6,226,364 | B1 * | 5/2001 | O'Neil | 379/114.2 |
| 6,282,274 | B1 * | 8/2001 | Jain | 379/114 |
| 6,366,893 | B2 * | 4/2002 | Hannula et al. | 705/40 |
| 6,415,156 | B1 * | 7/2002 | Stadelmann | 455/466 |
| 6,515,989 | B1 * | 2/2003 | Ronneke | 370/389 |
| 6,636,502 | B1 * | 10/2003 | Lager | 370/352 |
| 6,694,316 | B1 * | 2/2004 | Langseth et al. | 707/10 |
| 6,804,720 | B1 * | 10/2004 | Vilander et al. | 709/229 |

FOREIGN PATENT DOCUMENTS

| | | |
|---|---|---|
| WO | WO96/41286 | 12/1996 |
| WO | WO 97/41539 | 11/1997 |
| WO | WO 99/31610 | 6/1999 |
| WO | WO 99/33034 | 7/1999 |
| WO | WO 99/45684 | 9/1999 |
| WO | WO99/48312 | 9/1999 |

OTHER PUBLICATIONS

Business Editors, Leading Second Generation Internet Payment Software Solutions, GlobeID Software Announces Availability of @dvanced Payment Solution Suite, Business Wire. New York: Dec. 2, 1998. p. 1.*

* cited by examiner

US 7,319,855 B1

METHOD FOR CHARGING INTERNET SERVICES VIA A MOBILE TELEPHONE

CROSS-REFERENCE TO RELATED APPLICATION

This application is related to and claims the benefit under 35 U.S.C. §119 and 35 U.S.C. §365 of International Application No. PCT/DE00/03421, filed Sep. 28, 2000.

BACKGROUND OF THE INVENTION

1. Field of the Invention

The invention relates to a method for using and charging Internet services via a mobile telephone.

2. Description of the Related Art

Methods for charging Internet services via an Internet terminal (for example a personal computer) are known from prior art. According to methods previously known in the Internet the customer data are held in or loaded to the Internet terminal or by the dealer, but this is not practical when mobile telephone terminals are used as an Internet terminal.

EP-A-0 917 327 discloses a method for charging Internet services where the charges are settled centrally by the Internet service provider. The service provider has a special payment system that supports various payment methods and electronic monetary values. The payment system receives the requests for payment from a dealer to a user. When the payment request has been released by the user the user's account or telephone bill is debited with the respective amount by the payment system and the amount is transmitted to the dealer in the form of electronic monetary values.

WO-A-99 33034 specifies a method for controlling financial transactions via a mobile communication system where a user can release and process payment transactions, for example, to any dealer terminal (points of sale) via his mobile telephone. The amount to be paid is debited to the user's account and credited to the dealer, for example.

Therefore, the invention is based on the following problem:

To provide a method with which especially Internet services can be charged quickly and safely via a mobile telephone.

The problem is solved by the features of the independent patent claims.

BRIEF SUMMARY OF THE INVENTION

A mobile telephone customer pays a small individual fee for certain contents (information, database searches, travel schedules, games, etc.) when surfing the Internet using a WAP-enabled terminal (wireless application protocol), for example. According to the invention, said amount can be settled efficiently and reliably via the mobile telephone network.

Advantages compared to the prior art.

According to earlier micropayment methods known in the Internet the micropayment account is opened at the bank of the customer and made available to the customer in the form of an electronic money purse in the personal computer. This is not feasible for mobile telephones having limited capacity.

The reservation method of the invention allows that minimal amounts can be settled requiring a minimum of communication. On the other hand, the customer is always in control of the costs via the authorization.

Sensitive data remain within the safe mobile telephone network and are not transmitted via the Internet. Therefore, no additional encoding methods are required. The customer is known in the mobile telephone network via his MSISDN. Therefore, no additional authentication method is required, but the customer's anonymity vis-à-vis the provider is ensured.

DETAILED DESCRIPTION OF THE INVENTION

Figure 1:
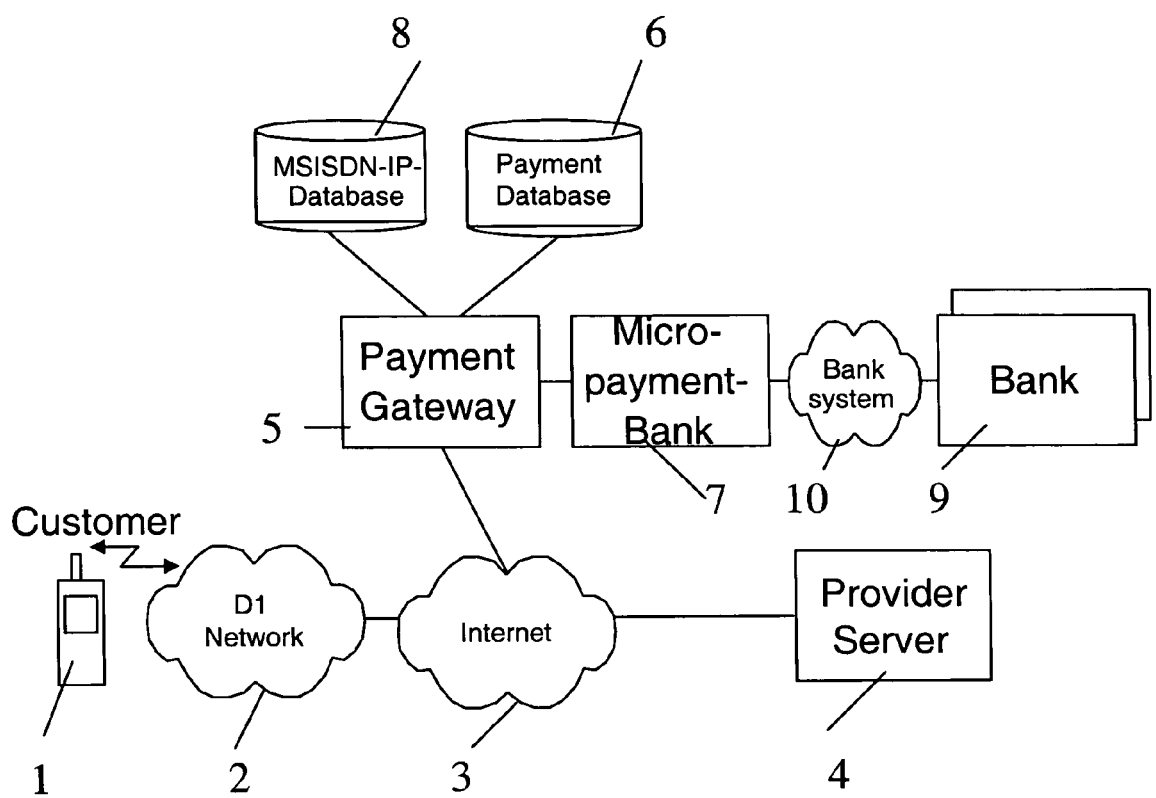
FIG. 1 shows an example of the system architecture of the invention.

Five parties are involved in the charging process: the customer, the provider, the payment gateway, the micropayment bank and the bank system.

The customer has an Internet-enabled (WAP-enabled) mobile telephone terminal 1 and has access to the Internet 3 via the mobile telephone network 2.

An interface is added by the provider to his standard Internet server software available in a provider server 4 so as to create a payment gateway 5. The content of the offers (information, games, database searches, etc.) can be called up in a format that is adapted to the mobile telephone terminal 1.

The MSISDN of the mobile telephone user, the account number of a micropayment account 7 of the customer and his current credit balance are the customer data held by the payment gateway 5 in a payment database 6. The payment gateway is able to find the MSISDN pertaining to a temporary IP address via an inquiry in a MSISDN-IP database 8.

The micropayment account 7 is maintained as a sub-account of an actual bank account at a bank. The payment gateway 5 and the micropayment account 7 are continuously synchronized by matching the databases. The micropayment account 7 can be prepaid or postpaid. The customer is able to access the current account balance and the current bookkeeping entries in the account 7 at any time via the Internet 3. Transfers from the micropayment account 7 to the provider accounts at other banks 9 are made collectively over a period of time (day, week, month, for example) via the bank system 10.

Figure 2:
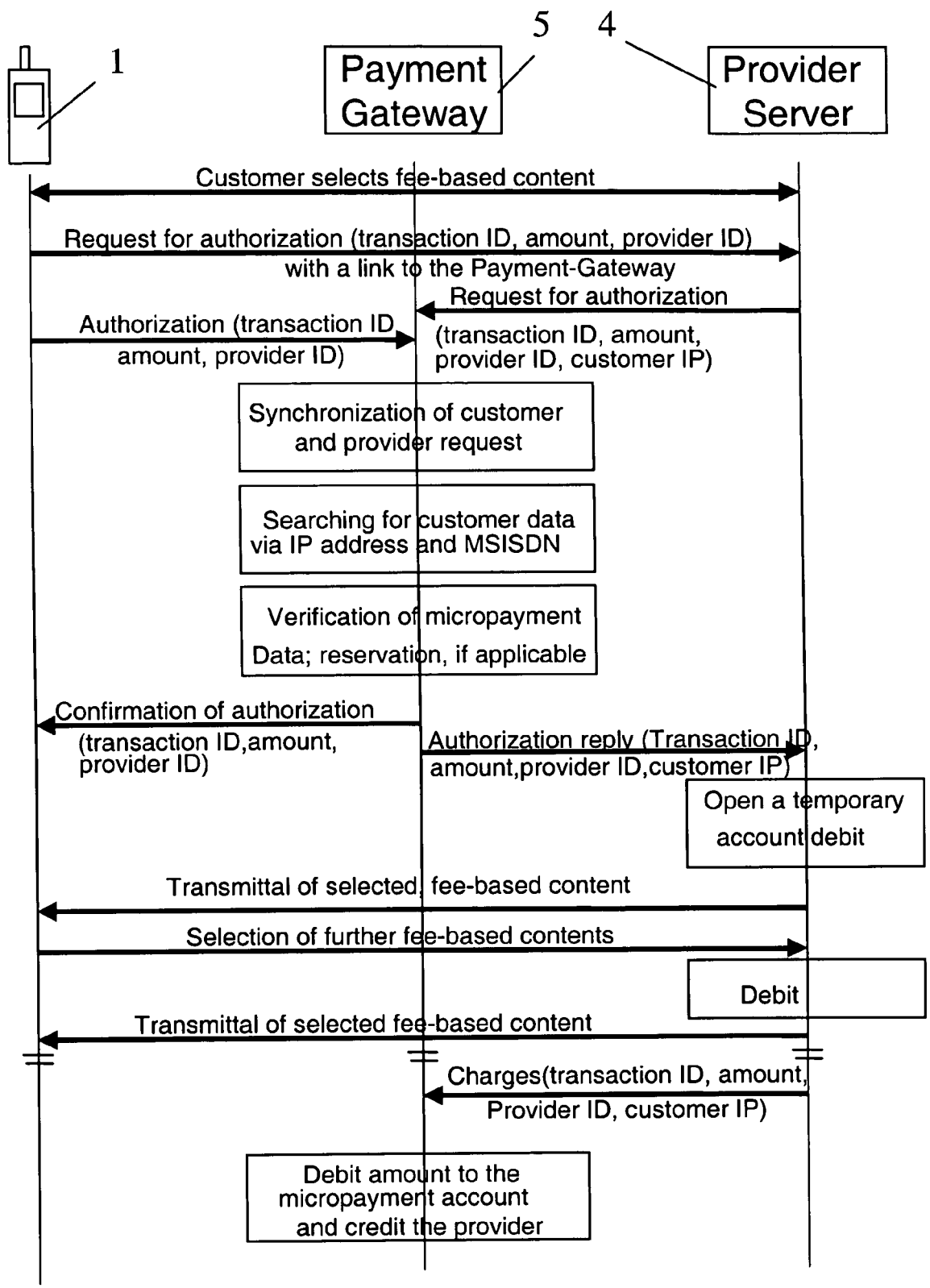
FIG. 2 shows an example of the process of a payment transaction.

Description of the process based on FIGS. 1 and 2. When a mobile telephone-Internet user surfs a contractual server of the mobile telephone network operator the provider recognizes the operator based on the user's IP address range.

While surfing, the mobile telephone-Internet user receives a message at a certain place that the content is fee-based. The provider determines whether the fee is charged per time unit or per click. When the user selects said content he will be asked to authorize the payment for contents up to a maximum amount. Said request sent by the provider includes the transaction data (transaction ID, amount, provider ID) and a link to the payment gateway 5. The provider sends the same data, expanded by the temporary IP address of the mobile telephone-Internet user to the payment gateway 3. When the user clicks on OK, the transaction data is also transmitted from his terminal 1 to the payment gateway 5. The customer can secure such action with a payment PIN.

The payment gateway 5 synchronizes the two messages and verifies that they concur. The user's IP address, the transaction ID, the amount and the provider ID have to be identical. The payment gateway 5 determines the MSISDN of the mobile telephone-Internet user via the user's IP address and with the MSISDN it searches for the pertaining customer data filed in the payment database 6. The payment gateway 5 now attempts to reserve the requested amount in the micropayment account.

In case of prepayment the credit balance can be verified, in case of post-payment the credit limit can be verified. A maximum amount per time period (for example DEM 100/ month) defined by the customer can also be verified.

If the result of the verification is positive the provider receives authorization for the requested amount and can apply said amount. As long as the mobile telephone-Internet user remains in the server 4 of the provider he will be able to use fee-based contents without further payment authorization. The provider debits the small amounts against the amount transferred to him. When it is used up the provider can initiate another authorization. The process is not concluded until the user fails to use the server of the provider over a certain time period. The charge(s), including transaction ID, amount, provider ID and the IP address of the user are transmitted to the payment gateway. The provider can display the current status of the charges on every page he transmits to the customer.

The payment gateway 5 allocates the actual charges to the reservations and transfers the amounts from the micropayment account 7 to the provider. The respective reservations are cancelled. The actual payment flow to the provider's receiving account can take place collectively at a later time. The reservations are also cancelled by the payment gateway 5 when no charge has been received from the provider with the respective transaction ID within a defined time period.

The customer opens his micropayment account 7 at the micropayment bank of the mobile telephone network operator. The account is generally prepaid, unless the customer has the creditworthiness required by the mobile telephone network operator. The customer can make deposits to his micropayment account and check the bookkeeping entries at any time via the Internet.

When the requirements for security are low it is possible to establish asymmetrical authorization requests to the payment gateway 5 so as to simplify the method, i.e. only the customer sends a message or only the provider sends a message to the payment gateway to initiate the reservation transaction. In these cases, the synchronization is omitted.

The invention claimed is:

1. A method for using and charging Internet services via a mobile telephone, comprising the steps of:
   establishing a payment gateway which is accessible by a mobile telephone-Internet user via a mobile telephone terminal and by a provider via a provider server, where customer data of the user is held centrally in a database of the payment gateway,
   opening and funding a micropayment account held at an actual bank, the payment gateway and the micropayment account being continuously synchronized by means of matching their respective databases,
   the user requesting a service or content from the provider,
   in response to said user request, the provider sending an authorization request to the user wherein the authorization request comprises transaction data including a certain transaction amount to be reserved and against which small fee amounts to the provider are debited and a link to the payment gateway, the provider sending the same transaction data to the payment gateway by means of a message,
   upon the user so authorizing, the transaction data is also transmitted from the user's terminal to the payment gateway by means of a message,
   the payment gateway synchronizing the two messages, verifying that the messages concur and then reserving the certain transaction amount in the micropayment account, and
   the payment gateway then debiting a fee amount or amounts up to the certain reserved transaction amount to the micropayment account, crediting the fee amount or amounts to the provider and canceling any balance of the respective reserved certain transaction amount in the micropayment account remaining after the fee amount or amounts is/are debited,
   wherein the certain reserved amount is less than the balance in the micropayment account and greater than or equal to the fee amount or amounts debited against the micropayment account.

2. The method as defined by claim 1, wherein no electronic money purse data and no customer data are held in the terminal.

3. The method as defined by claim 1, further comprising the step of securing all payment transactions by means of a customer payment PIN.

4. The method as defined by claim 1, further comprising the step of limiting sensitive data safely within the mobile telephone network and not transmitting sensitive data via the Internet.

5. The method as defined by claim 1, further comprising the step of authenticating the customer via the mobile telephone network.

6. The method as defined by claim 2, further comprising the step of securing all payment transactions by means of a customer payment PIN.

7. The method as defined by claim 2, further comprising the step of limiting sensitive data safely within the mobile telephone network and not transmitting sensitive data via the Internet.

8. The method as defined by claim 3, further comprising the step of limiting sensitive data safely within the mobile telephone network and not transmitting sensitive data via the Internet.

9. The method as defined by claim 2, further comprising the step of authenticating the customer via the mobile telephone network.

10. The method as defined by claim 3, further comprising the step of authenticating the customer via the mobile telephone network.

11. The method as defined by claim 4, further comprising the step of authenticating the customer via the mobile telephone network.

12. A method for using and charging Internet services via a mobile telephone, comprising the steps of:
   authenticating a mobile telephone-Internet user via a mobile telephone network;
   establishing a payment gateway which is accessible by the mobile telephone-Internet user via a mobile telephone terminal and by a provider via a provider server, where customer data of the user is held centrally in a database of the payment gateway;
   opening and funding a micropayment account held at an actual bank, the payment gateway and the micropayment account being continuously synchronized by means of matching their respective databases;
   the user requesting a service or content from the provider;
   in response to said user request, the provider sending an authorization request to the user wherein the authorization request comprises transaction data including a certain transaction amount to be reserved and against which small fee amounts to the provider are debited and a link to the payment gateway, the provider sending the same transaction data to the payment gateway by means of a message;

upon the user so authorizing, the transaction data is also transmitted from the user's terminal to the payment gateway by means of a message;

the payment gateway synchronizing the two messages, verifying that the messages concur and then reserving the certain transaction amount in the micropayment account; and the payment gateway then debiting a fee amount or amounts up to the certain reserved transaction amount to the micropayment account, crediting the fee amount or amounts to the provider and canceling any balance of the respective reserved certain transaction amount in the micropayment account remaining after the fee amount or amounts is/are debited, wherein the certain reserved amount is less than the balance in the micropayment account and greater than or equal to the fee amount or amounts debited against the micropayment account.

13. The method as defined by claim 12 further comprising coupling standard dealer software with standard (Internet) payment systems and Internet-enabled standard mobile telephone terminals.

14. The method as defined by claim 1 further comprising coupling standard dealer software with standard (Internet) payment systems and Internet-enabled standard mobile telephone terminals.

* * * * *